US012447704B2

(12) United States Patent
Feder et al.

(10) Patent No.: US 12,447,704 B2
(45) Date of Patent: Oct. 21, 2025

(54) METHOD FOR VULCANIZING A GREEN TIRE USING AN ORGANOPOLYSILOXANE-BASED MOLD RELEASE AGENT LUBRICANT COMPOSITION

(71) Applicant: ELKEM SILICONES FRANCE SAS, Lyons (FR)

(72) Inventors: Michel Feder, Vienne (FR); Stefan Breunig, Villette de Vienne (FR)

(73) Assignee: ELKEM SILICONES FRANCE SAS, Saint-Fons (FR)

( * ) Notice: Subject to any disclaimer, the term of this patent is extended or adjusted under 35 U.S.C. 154(b) by 370 days.

(21) Appl. No.: 17/787,574

(22) PCT Filed: Dec. 18, 2020

(86) PCT No.: PCT/FR2020/052550
§ 371 (c)(1),
(2) Date: Jun. 20, 2022

(87) PCT Pub. No.: WO2021/123678
PCT Pub. Date: Jun. 24, 2021

(65) Prior Publication Data
US 2023/0001656 A1  Jan. 5, 2023

(30) Foreign Application Priority Data
Dec. 20, 2019 (FR) ...................... 1915183

(51) Int. Cl.
*B29D 30/06* (2006.01)
*B29C 33/58* (2006.01)
*B29C 33/64* (2006.01)
*C08L 83/04* (2006.01)

(52) U.S. Cl.
CPC .......... *B29D 30/0654* (2013.01); *B29C 33/58* (2013.01); *B29C 33/64* (2013.01); *B29D 30/0662* (2013.01); *C08L 83/04* (2013.01); *B29D 2030/0659* (2013.01)

(58) Field of Classification Search
CPC ..... B29C 33/58; B29C 33/64; B29D 30/0654; B29D 30/0662; B29D 2030/0659; C08L 83/04
See application file for complete search history.

(56) References Cited

U.S. PATENT DOCUMENTS 5,738,813 A  4/1998  Naganawa et al.
2020/0048461 A1*  2/2020  Kobayashi ............... C09D 7/70

FOREIGN PATENT DOCUMENTS

| GB | 2088898 A | 6/1982 | |
| JP | 5-96546 A | 4/1993 | |
| WO | 2006/106236 A2 | 10/2006 | |
| WO | WO-2014029604 A1 * | 2/2014 | ............. C08G 77/14 |

OTHER PUBLICATIONS

International Search Report and Written Opinion dated Nov. 12, 2020, issued in corresponding International Patent Application No. PCT/FR2020/052550, 17 pages.

* cited by examiner

*Primary Examiner* — Anthony J Green
(74) *Attorney, Agent, or Firm* — SHEPPARD, MULLIN, RICHTER & HAMPTON LLP

(57) ABSTRACT

A method is described for vulcanizing a green tire using an organopolysiloxane-based mold release agent lubricant composition. Also described, is an organopolysiloxane-based mold release agent lubricant composition.

23 Claims, No Drawings

METHOD FOR VULCANIZING A GREEN TIRE USING AN ORGANOPOLYSILOXANE-BASED MOLD RELEASE AGENT LUBRICANT COMPOSITION

CROSS-REFERENCE TO PRIOR APPLICATIONS

This application is a National Stage of PCT/FR2020/052550, filed Dec. 18, 2020, and designating the United States (published on Jun. 24, 2021, as WO2021/123678A1), which claims priority under 35 U.S.C. § 119 to French Patent Application No. FR1915183, filed Dec. 20, 2019, hereby expressly incorporated by reference in its entirety and assigned to the assignee hereof.

TECHNICAL FIELD

The present invention relates to a process for vulcanizing a green tire using an organopolysiloxane-based mold release agent lubricant composition. The present invention also relates to an organopolysiloxane-based mold release agent lubricant composition

TECHNICAL BACKGROUND

The manufacture of a tire mainly comprises three steps, namely the preparation of the semifinished products, the assembly of said products and the curing of the casing.

The preparation of the semifinished products consists in producing the components of the casing: rubbers, textile and metal plies, bead wires.

The assembly step consists in superposing the various semifinished products in order to form the tire. The carcass, made up of different internal layers: inner liner rubber, carcass ply, bead wires, and all the rubber plies, is placed on a cylinder having the diameter of the tire: the drum. After forming, the drum giving the carcass its toroidal appearance, the belt plies and the tread band are laid: a green tire, with a non-vulcanized and unformed casing, which is still plastic, is obtained. At the end of the assembly step, the future tire is also called a green outer casing or green casing. Its cohesion is ensured simply by the raw bonding of the products.

Finally, curing makes the tire change from the plastic state to the elastic state by forming sulfur bridges between the elastomer chains: this is vulcanization. The curing process creates the composite structure between the various components of the casing. The mixtures bond together, the plies and the threads intermingle. Vulcanization in a mold is performed in metal presses using the combined action of heat and pressure. The green outer casing or green tire is heated simultaneously on the outside, for example with steam circulating inside the walls of the mold, and on the inside, generally with a hot fluid under pressure contained in a rubber membrane, also called an expandable bladder.

The hot fluid, such as hot gas, hot water and/or steam, participates in the heat transfer for the vulcanization.

The pressure, generally greater than 10 bar, usually between 15 and 25 bar, serves to compress the tire from the inside and to press it against the mold so that it can take on the shape, the sculptures and the markings that have been engraved in said metal mold.

The curing time varies according to the size of the tire, the operating techniques and the mixtures used: it is about 15 minutes for a motor vehicle tire and can be up to 24 hours or more for large tires intended for earthmoving machinery. The vulcanization temperature is generally between 80° C. and 220° C.

This operation causes the rubber mixture to lose its initial plasticity, giving it stable elastic properties.

The casing is then partially cooled in the mold, this cooling sometimes being aided by introducing cold or cooler water into the bladder. The mold is then opened and the bladder is deflated by releasing the pressure of the internal fluid, and the vulcanized tire is removed from the press. This use of vulcanization bladders is well known in the art.

It is acknowledged that appreciable relative movement takes places between the outer contact surface of the bladder and the inner surface of the green casing during the bladder expansion phase prior to complete vulcanization of the casing. Similarly, there is also considerable relative movement between the outer contact surface of the bladder and the inner surface of the molded and vulcanized casing, during deflation of the bladder and removal of the tire.

If adequate lubrication is not provided between the bladder and the inner surface of the casing, the bladder generally tends to wrinkle, resulting in deformation of the casing in the mold and also excessive wear and roughening of the surface of the bladder itself. The bladder surface also tends to bond to the inner surface of the casing during curing. After the casing is vulcanized, and notably during the final part of the casing vulcanization cycle during which the bladder is deflated, the bladder then remains inseparably bonded to the tire.

This involves demolding two rubber surfaces, namely the inner surface of the vulcanized tire from the outer surface of the bladder and not the outer surface of the vulcanized tire from the inner surface of the metal mold. EP022706 describes an agent for molding rubber objects to be deposited on the outer surface of the rubber blank in contact with the mold.

In addition, the bladder must be reusable without further processing for other molding/demolding cycles. For this reason, the outer surface of the bladder or the inner surface of the green or non-vulcanized casing is coated with a suitable lubricant or mold-release agent.

Lubrication of the vulcanization bladder may be performed at each molding/demolding cycle, referred to as a single mold release, or after multiple molding/demolding cycles, referred to as multiple demolding. Multiple demolding allows tire manufacturers to improve productivity by reducing the rate of defect occurrence and decreasing the frequency of treatment with said mold-release agent.

Lubrication of the vulcanization bladder used in the forming and vulcanization of green tires may be performed in two different ways.

The expandable rubber bladder used in the vulcanization of green tires is initially coated with a lubricant composition. The lubrication of the bladder is direct.

According to an alternative, the mold-release agent is applied to the inside of the green tire that will be in contact with the expandable bladder. Next, the green tire is placed inside the press. The mold is closed and the bladder is inflated. The mold-release agent ensures that the bladder is optimally centered inside the tire, which is necessary for producing perfectly symmetrical tires. It also aids in preventing bladder defects such as pinching and wrinkling. When the metal mold is closed and the bladder is fully expanded, the temperature is increased to 220° C. During this phase, the mold-release agent must withstand the temperature and must transfer from the inner face of the tire to the outer face of the bladder. The tire is vulcanized in the closed press, with the bladder fully expanded with a pressurized fluid, between 150 and 220° C. During this step, the tire must not stick to the bladder. The film of mold-release agent forms the necessary barrier between the tire and the bladder. The antibonding effect of the mold-release agent is ensured by creating a continuous separating layer between the bladder and the inner face of the tire. This is the main function of a bladder mold-release agent. If the barrier has defects, the tire may vulcanize on the bladder rubber, making it impossible to separate the two without destructive rupture. After vulcanization, the bladder is deflated. The mold-release agent must provide the antibonding effect, enabling the bladder to separate from the tire.

The advantage of applying the mold-release agent to the inside of the green tire is that this is done outside the press, thus avoiding any unwanted pollution of the press.

Silicone compositions that can be crosslinked into elastomers to facilitate molding-demolding during the manufacture of tires are known, and are described, for example, in the review Tire Technology (Tire release agents, Stefan Breunig, Tire technology International 2013, 68-72).

Thus, patents EP1240283, EP1495076 and EP2038354 relate to siloxane-based lubricant compositions that are capable of crosslinking by polycondensation and thus without giving off hydrogen. Patent application EP1899447 and patent U.S. Pat. No. 4,840,742 relate to silicone compositions that are capable of crosslinking by dehydrogenation-condensation.

Moreover, it is important for the deposition of the mold-release agent on the tire or bladder to be regular, in order to ensure the absence of uncovered areas, which would lead to release difficulties or to appearance defects on the vulcanized tire. However, due to the black color of the tire and the bladder, it is not always easy to see where the mold-release agent has been applied. Furthermore, it is important that the mold-release agent not degrade the appearance of the vulcanized tire.

In this context, one object of the present invention is to provide a process for vulcanizing a green tire using a mold-release composition whose application to the green tire or to the bladder can be visually controlled, and which does not degrade the appearance of the vulcanized tire.

Another object of the invention is to provide a mold-release composition whose application to the green tire or to the bladder can be visually controlled.

Another object of the invention is to provide a mold-release composition whose application to the green tire or to the bladder can be visually controlled, and which does not degrade the appearance of the vulcanized tire.

BRIEF DESCRIPTION OF THE INVENTION

These and other objects are achieved by the present invention, which relates firstly to a process for vulcanizing a green tire in a metal press using an expandable rubber bladder, said process comprising the following steps:
1. coating the inside of the green tire or the outside of the expandable rubber bladder with a colored lubricant mold-release composition (I), in the form of an oil-in-water emulsion, to form a colored coating that is visible to the naked eye on the green tire or on the bladder, said lubricant composition (I) comprising:
   a. at least one organopolysiloxane (A);
   b. at least one surfactant (B);
   c. at least one non-fluorescent pigment (C); and
   d. water (D);
   the amounts of surfactant(s) and water being sufficient to obtain an oil-in-water emulsion;
2. inflating the bladder and vulcanizing the tire in the metal press, preferably at a temperature of between 80 and 220° C. and for a time of between 10 minutes and 24 hours; and
3. demolding the tire;
characterized in that the interior of the tire obtained in step 3) no longer has any coloring that is visible to the naked eye.

By using a lubricant mold-release composition (I) comprising a non-fluorescent pigment (C), it is possible to obtain a colored composition. Consequently, its application to the green tire or to the bladder enables the formation of a colored coating that is visible to the naked eye. It is thus readily possible to visualize, with the naked eye, where the composition has been applied. Since the colored coating is visible to the naked eye, no equipment, such as a UV lamp, is needed to visualize where the composition has been applied. This ensures even application and that there are no areas not covered with the mold-release agent.

Furthermore, after vulcanization, the coloring is no longer visible on the inside of the vulcanized tire. The lubricant mold-release composition (I) loses its coloration during vulcanization. Thus, the use of this lubricant mold-release composition (I) does not change the appearance of the vulcanized tire.

The invention also relates to a colored lubricant mold-release composition (I), in the form of an oil-in-water emulsion, comprising:
   a. at least one organopolysiloxane (A); chosen from the group consisting of:
      non-reactive organopolysiloxanes (E) which, per molecule, contain monovalent organic substituents, which may be identical or different, bonded to the silicon atoms, and which are chosen from the group consisting of $C_1$-$C_{40}$ alkyl, $C_3$-$C_8$ cycloalkyl, $C_6$-$C_{10}$ aryl and $C_7$-$C_{50}$ alkylaryl radicals;
      reactive organopolysiloxanes (F) including at least two ≡SiOH silanol groups per molecule;
      and mixtures thereof,
   b. at least one surfactant (B),
   c. at least one non-fluorescent pigment (C); and
   d. water (D),
   the amounts of surfactant(s) and water being sufficient to obtain an oil-in-water emulsion.

The present invention also relates to a process for lubricating (P1) an expandable rubber bladder that is useful in the vulcanization of a green tire in a metal press, characterized in that the outer surface of said bladder to be brought into contact with the inner face of said green tire is coated with a colored lubricant mold-release composition (I), said process thus making it possible to directly obtain an expandable rubber bladder that is lubricated on its outer surface.

The present invention also relates to a process for lubricating (P2) an expandable rubber bladder that is useful during the vulcanization of a green tire in a metal press, characterized in that, in a first step outside the press, the inner surface of said green tire is coated with a colored lubricant mold-release composition (I);
said step thus producing a green tire whose inner surface is coated with said composition (I); and in a subsequent step in the metal press, the green tire whose inner surface is coated with composition (I) is placed in contact with an expandable rubber bladder; said process thus producing by transfer an expandable rubber bladder that is lubricated on its outer face.

The present invention also relates to an expandable rubber bladder or a green tire coated with a colored lubricant mold-release composition (I).

DETAILED DESCRIPTION

Process for Vulcanizing a Green Tire

The present invention relates firstly to a process for vulcanizing a green tire in a metal press using an expandable rubber bladder, said process comprising the following steps:
1. coating the inside of the green tire or the outside of the expandable rubber bladder with a colored lubricant mold-release composition (I), in the form of an oil-in-water emulsion, to form a colored coating that is visible to the naked eye on the green tire or on the bladder, said lubricant composition (I) comprising:
   a. at least one organopolysiloxane (A);
   b. at least one surfactant (B);
   c. at least one non-fluorescent pigment (C); and
   d. water (D);
   the amounts of surfactant(s) and water being sufficient to obtain an oil-in-water emulsion;
2. inflating the bladder and vulcanizing the tire in the metal press, preferably at a temperature of between 80 and 220° C. and for a time of between 10 minutes and 24 hours; and
3. demolding the tire;
characterized in that the interior of the tire obtained in step 3) no longer has any coloring that is visible to the naked eye.

In step 1, the colored lubricant mold-release composition (I) may be applied to the inside of the green tire or the outside of the expandable rubber bladder.

According to one embodiment, it is the outside of the expandable rubber bladder that is coated with composition (I). In this case, the lubrication of the bladder is direct.

According to another embodiment, it is the inside of the green tire that is coated with composition (I). Advantageously, the inside of the green tire is coated with composition (I) outside the press. The green tire is then placed inside the press, and then, when the bladder is inflated and the tire is vulcanized in step 2, composition (I) transfers from the inner side of the tire to the outer face of the bladder. The bladder is then indirectly lubricated.

The application of the colored lubricant mold-release composition (I) allows the formation of a colored coating that is visible to the naked eye on the green tire or on the bladder. This makes it easy to see where the composition has been applied. The term "colored coating that is visible to the naked eye" means a coating, the color of which is visible without the aid of any viewing device.

The amount of colored lubricant mold-release composition (I) applied to the green tire or to the bladder in step 1 may be between 1 and 50 g/m², preferably between 3 and 20 g/m².

The thickness of the colored coating that is visible to the naked eye on the green tire or on the bladder may be between 1 and 50 µm, preferably between 3 and 20 µm.

Step 1 may be performed using application methods that are well known to those skilled in the art. In particular, composition (I) may be applied by brush or sponge, or by spraying. Application by spraying may be performed in several passes so as to ensure that the coating is uniform and homogeneous.

Step 2 of inflating the bladder and vulcanizing the tire in the metal press is preferably performed at a temperature of between 80 and 220° C. and for a time of between 5 minutes and 24 hours, for example 20 minutes at 170° C.

The inflation of the bladder may be performed using a hot fluid such as hot gas, hot water and/or steam.

The pressure in the bladder is advantageously greater than 10 bar, and is preferably between 15 and 25 bar.

The tire obtained in step 3 no longer has any coloring that is visible to the naked eye. Thus, the colored coating that is visible to the naked eye on the green tire or on the bladder obtained in step 1 has lost its coloring during step 2.

This loss of coloring may be determined by spectrophotometry, which measures colorimetry. Colorimetry allows a color to be defined using, for example, the CIELab model, i.e., the L* a* b* CIE 1976 color space. This model, which is well known to those skilled in the art, uses three parameters to characterize colors:
   the lightness, L which takes values between 0 (black) and 100 (white)
   the parameter a representing a value on a green-red axis
   the parameter b representing a value on a blue-yellow axis.

It is also possible to measure a gap between two colors in the following manner:

$$\text{Delta } E=\sqrt{(\Delta L)^2+(\Delta a)^2+(\Delta b)^2} \qquad \text{[Math. 1]}$$

with $\Delta L=L2-L1$, $\Delta a=a2-a1$, and $\Delta b=b2-b1$

These various parameters used to characterize the colors and color changes can be measured using a colorimeter.

The colored lubricant mold-release composition (I) forms a colored coating that is visible to the naked eye. This coating is visible to the naked eye because there is sufficient contrast between composition (I) and the tire or the bladder. This contrast can be characterized by the initial delta E. This initial delta E is the difference in color between (I) the coated green tire or the coated bladder and (ii) the uncoated green tire or the uncoated bladder. The measurement (I) can be taken after application and drying of composition (I) on the green tire or bladder. The drying can be performed at room temperature, for a period of between 30 minutes and 2 hours, for example for a period of 1 hour. Advantageously, this initial delta E is greater than or equal to 5, preferably greater than or equal to 8. Thus, the colored coating that is visible to the naked eye on the green tire can be defined as having an initial delta E of greater than or equal to 5, preferably greater than to or equal to 8. Advantageously, this initial delta E may be between 5 and 100, preferably between 8 and 50.

In particular, the colored coating that is visible to the naked eye on the green tire or on the bladder obtained in step 1 may have a loss of color (X) of between 85% and 100%, between step 1 and step 3, the loss of color (X) being determined by spectrocolorimetry in the following manner:

$$X = 100 * \left| \frac{\text{final Delta } E - \text{initial Delta } E}{\text{initial Delta } E} \right| \qquad \text{[Math. 2]}$$

The initial delta E corresponds to the delta E of composition (I) in step 1 after being deposited on the green tire or on the bladder. This initial delta E is the difference in color between (I) the coated green tire or the coated bladder and (ii) the uncoated green tire or the uncoated bladder. The final delta E is the delta E of the coating in step 3 after vulcanization. This final delta E is the color difference between (I) the coated green tire after step 3 and (ii) the uncoated green tire. Thus, the interior of the tire obtained in step 3), which no longer has any coloring that is visible to the naked eye, may be defined as having a final delta E of less than or equal to 3, preferably less than or equal to 2. Advantageously, this final delta E may be between 0 and 3, preferably between 0 and 2.

Preferably, the loss of color (X) is between 90% and 100%.

This loss of color (X) may be determined in particular after a step 2 performed at 170° C. for 20 minutes.

The invention also relates to a process for vulcanizing a green tire in a metal press using an expandable rubber bladder, said process comprising the following steps:

1. coating the inside of the green tire or the outside of the expandable rubber bladder with a colored lubricant mold-release composition (I), in the form of an oil-in-water emulsion, to form a coating on the green tire or on the bladder, said lubricant composition (I) comprising:
   a. at least one organopolysiloxane (A);
   b. at least one surfactant (B);
   c. at least one non-fluorescent pigment (C) chosen from the group consisting of, according to the Colour Index classification: monoazo, disazo, amino ketone, indigoid, phthalocyanine, oxazine, and mixtures thereof, preferably in the form of an aqueous dispersion; and
   d. water (D);
   the amounts of surfactant(s) and water being sufficient to obtain an oil-in-water emulsion;
2. inflating the bladder and vulcanizing the tire in the metal press, preferably at a temperature of between 80 and 220° C. and for a time of between 10 minutes and 24 hours; and
3. demolding the tire.

Colored Lubricant Mold-Release Composition (I)

The colored lubricant mold-release composition (I) is an oil-in-water emulsion based on organopolysiloxanes.

To describe the organopolysiloxanes, reference is made to units M, D, T and Q. The letter M represents the monofunctional unit of formula $(R)_3SiO_{1/2}$, the silicon atom being bonded to only one oxygen atom in the polymer comprising this unit. The letter D means a difunctional unit $(R)_2SiO_{2/2}$ in which the silicon atom is bonded to two oxygen atoms. The letter T represents a trifunctional unit of formula $(R)SiO_{3/2}$ in which the silicon atom is bonded to three oxygen atoms. The letter Q represents a tetrafunctional unit of formula $SiO_{4/2}$ in which the silicon atom is bonded to four oxygen atoms. The symbol R has the same definition as the symbols $R^2$, $R^3$ and $R^4$ defined below. The units M, D and T may be functionalized. They are then referred to as M, D and T units while specifying the specific radicals.

The colored lubricant mold-release composition (I) comprises at least one organopolysiloxane (A), which may be chosen from the group consisting of:

non-reactive organopolysiloxanes (E) which, per molecule, contain monovalent organic substituents, which may be identical or different, bonded to the silicon atoms, and which are chosen from the group consisting of $C_1$-$C_{40}$ alkyl, $C_3$-$C_8$ cycloalkyl, $C_6$-$C_{10}$ aryl and $C_7$-$C_{50}$ alkylaryl radicals;

reactive organopolysiloxanes (F) including at least two ≡SiOH silanol groups per molecule;

and mixtures thereof.

The colored lubricant mold-release composition (I) may comprise from 0.1 to 60 parts by weight and preferably from 0.1 to 30 parts by weight of at least one non-reactive organopolysiloxane (E).

The colored lubricant mold-release composition (I) may comprise from 0.1 to 60 parts by weight and preferably from 0.1 to 30 parts by weight of at least one reactive organopolysiloxane (F).

In the context of the invention, the term "non-reactive" refers to an organopolysiloxane which, under the conditions of emulsification, of preparation of the lubricant composition and of use, does not react chemically with any of the constituents of the composition.

The non-reactive organopolysiloxane (E) may be an oil or a gum, and preferably has a dynamic viscosity of between 50 and 600 000 mPa·s at 25° C. or a consistency of between 200 and 2000 expressed in tenths of a millimeter at 25° C.

The dynamic viscosity of the silicones is measured at 25° C. according to the standard ASTM D 445.

The term "gum" is used for organosilicon compounds with viscosities conventionally greater than ~600 000 mPa·s, which corresponds to a molecular weight of greater than 260 000 g/mol.

The consistency or penetrability of a gum is determined at 25° C. by means of a penetrometer of PNR12 type or equivalent model allowing a cylindrical head to be applied to the sample under standardized conditions.

The penetrability of a rubber is the depth, expressed in tenths of a millimeter, to which a calibrated cylinder penetrates the sample over one minute.

For this purpose, a rubber sample is introduced into an aluminum cup 40 mm in diameter and 60 mm tall. The bronze or brass cylindrical head is 6.35 mm in diameter and 4.76 mm long and is borne by a metal rod 51 mm long and 3 mm in diameter which fits onto the penetrometer. This rod is weighted with a 100 g load. The total weight of the assembly is 151.8 g including 4.3 for the cylindrical part and its support rod. The cup containing the rubber sample is placed in the thermostatic bath at 25±0.5° C. for at least 30 min. The measurement is taken according to the manufacturer's instructions. The values of the depth (V) in tenths of a millimeter and the time (t) in seconds to reach this depth are indicated on the apparatus. The penetrability is equal to 60 V/t expressed in tenths of a millimeter per minute.

The non-reactive organopolysiloxane gums (E) that may be used in accordance with the invention are used alone or as a mixture in an inorganic solvent. This solvent may be chosen from volatile silicones, octamethylcyclotetrasiloxane (D4), decamethylcylopentasiloxane (D5), polydimethylsiloxane (PDMS) oils, polyphenylmethylsiloxane (PPMS) oils or mixtures thereof, so as to avoid the use of organic solvents that are harmful to the environment and to the health of the workers in the tire manufacturing workshops.

Advantageously, the non-reactive organopolysiloxane (E) is a linear non-reactive organopolysiloxane oil (E) which is a linear homopolymer or copolymer. Preferably the linear non-reactive organopolysiloxane oil (E) has a dynamic viscosity in the range from 0.65 to 100 000 mPa·s at 25° C. Examples that may be mentioned include linear organopolysiloxanes:

consisting along each chain:
   a. of units of formula $R^5R^6SiO_{2/2}$, optionally combined with units of formula $(R^5)_2SiO_{2/2}$;
   b. of units of formula $(R^6)_2SiO_{2/2}$, optionally combined with units of formula $(R^5)_2SiO_{2/2}$,
   c. of units of formula $R^5R^6SiO_{2/2}$ and units of formula $(R^6)_2SiO_{2/2}$, optionally combined with units of formula $(R^5)_2SiO_{2/2}$ and blocked at each chain end with a unit of formula $(R^7)_3SiO_{1/2}$, the radicals $R^7$ of which, which may be identical or different, being chosen from radicals $R^5$ and $R^6$, where the radicals $R^5$ and $R^6$, monovalent organic substituents of the various siloxyl units mentioned above, have the following definitions:

a. the radicals $R^5$, which may be identical or different, are chosen from,
   i. linear $C_1$-$C_6$ or branched $C_3$-$C_6$ alkyl radicals, for instance methyl, ethyl, propyl, isopropyl, butyl, isobutyl, t-butyl, n-pentyl or n-hexyl, and
   ii. $C_3$-$C_8$ cycloalkyl radicals, for instance cyclopentyl or cyclohexyl,
b. the radicals $R^6$, which may be identical or different, are chosen from
   i. $C_6$-$C_{10}$ aryl radicals, for instance phenyl or naphthyl,
   ii. $C_7$-$C_{15}$ alkylaryl radicals, for instance tolyl, xylyl, and
   iii. $C_7$-$C_{15}$ arylalkyl radicals, for instance benzyl.

The reactive organopolysiloxane (F) may be an oil or a gum, and preferably has a dynamic viscosity of between 50 and 600 000 mPa·s at 25° C. or a consistency of between 200 and 2000, expressed in tenths of a millimeter at 25° C.

Preferably, the reactive organopolysiloxane (F) of the colored lubricant mold-release composition (I) comprises the following siloxyl units:

$M^{OH}=[(OH)(R^2)_2SiO_{1/2}]$ and $D=[R^3R^4SiO_{2/2}]$ in which:

$R^2$, $R^3$ and $R^4$ are identical or different radicals chosen from the group consisting of:

linear or branched $C_1$-$C_6$ alkyl radicals, for instance methyl, ethyl, propyl, isopropyl, butyl, isobutyl, t-butyl, n-pentyl or n-hexyl;

$C_3$-$C_8$ cycloalkyl radicals, for instance cyclopentyl or cyclohexyl;

$C_6$-$C_{10}$ aryl radicals, for instance phenyl or naphthyl; and $C_7$-$C_{15}$ alkylaryl radicals, for instance tolyl or xylyl.

Even more preferentially, the reactive organopolysiloxane (F) of the mold-release composition (I) is an α,ω-bis(hydroxy)polydimethylsiloxane, which means that the radicals $R^2$, $R^3$ and $R^4$ of the siloxyl units of the reactive organopolysiloxane (F) are methyl radicals.

The reactive organopolysiloxane gums (F) in accordance with the invention are used alone or as a mixture in an inorganic solvent. This solvent may be chosen from volatile silicones, octamethylcyclotetrasiloxane (D4), decamethylcylopentasiloxane (D5), polydimethylsiloxane (PDMS) oils, polyphenylmethylsiloxane (PPMS) oils or mixtures thereof, so as to avoid the use of organic solvents that are harmful to the environment and to the health of the workers in tire manufacturing workshops.

An α,ω-bis(hydroxy)polydimethylsiloxane oil with a dynamic viscosity of from 50 to 600 000 mPa·s at 25° C. and an α,ω-bis(hydroxy)-polydimethylsiloxane gum with a consistency of between 200 and 2000 expressed in tenths of a millimeter at 25° C. are preferentially used as constituents (F).

The colored lubricant mold-release composition also comprises a surfactant (B). The nature of the surfactant (B) will be readily determined by a person skilled in the art, the object being to prepare a stable emulsion. Anionic, cationic, nonionic and zwitterionic surfactants may be used alone or in a mixture.

It should be noted that composition (I) according to the invention may also comprise protective colloids such as polyvinyl alcohol.

As anionic surfactants, mention may be made of the following surfactants the alkyl ester sulfonates of formula $R^a$—CH($SO_3M$)COO$R^b$, where $R^a$ represents a $C_8$-$C_{20}$, preferably $C_{10}$-$C_{16}$, alkyl radical, $R^b$ represents a $C_1$-$C_6$, preferably $C_1$-$C_3$, alkyl radical and M represents an alkali metal cation (sodium, potassium, lithium), substituted or unsubstituted ammonium (methyl-, dimethyl-, trimethyl-, tetramethylammonium, dimethylpiperidinium) or an alkanolamine derivative (monoethanolamine, diethanolamine, triethanolamine)

the alkyl sulfates of formula ROSO$_3$M, where $R^c$ represents a $C_{10}$-$C_{24}$, preferably $C_{12}$-$C_{20}$, alkyl or hydroxyalkyl radical, M representing a hydrogen atom or a cation of the same definition as above, and also the oxyethylenated (OE) and/or oxypropylenated (OP) derivatives thereof, preferably containing from 1 to 20 OE units the alkylamide sulfates of formula $R^d$CONH$R^e$OSO$_3$M where $R^d$ represents a $C_2$-$C_{22}$, preferably $C_6$-$C_{20}$, alkyl radical, $R^e$ represents a $C_2$-$C_3$ alkyl radical, M representing a hydrogen atom or a cation of the same definition as above, and also the oxyethylenated (OE) and/or oxypropylenated (OP) derivatives thereof, preferably containing from 1 to 20 OE units, salts of saturated or unsaturated $C_8$-$C_{24}$, preferably $C_{14}$-$C_{20}$, fatty acids, $C_9$-$C_{20}$ alkylbenzenesulfonates, and also the oxyethylenated (OE) and/or oxypropylenated (OP) derivatives thereof, preferably containing from 1 to 20 OE units $C_9$-$C_{20}$ alkylbenzenesulfonates, primary or secondary $C_8$-$C_{22}$ alkylsulfonates, alkylglycerol sulfonates, the sulfonated polycarboxylic acids described in GB-A-1 082 179, paraffin sulfonates, N-acyl-N-alkyltaurates, mono- and dialkyl phosphates, alkylisethionates, alkylsuccinamates, alkylsulfosuccinates, monoesters or diesters of sulfosuccinates N-acyl sarcosinates, alkyl glycoside sulfates, polyethoxycarboxylates, the cation being an alkali metal (sodium, potassium or lithium), a substituted or unsubstituted ammonium residue (methyl-, dimethyl-, trimethyl-, tetramethylammonium, dimethylpiperidinium) or an alkanolamine derivative (monoethanolamine, diethanolamine or triethanolamine).

As nonionic surfactants, mention may be made of poly(alkylene oxide) alkyl or aryl ethers, polyoxyethylene sorbitan hexasterate, polyoxyethylene sorbitan oleate and poly(ethylene oxide) cetyl stearyl ethers. As poly(alkylene oxide) aryl ethers, mention may be made of polyoxyethylene alkylphenols. As poly(alkylene oxide) alkyl ethers, mention may be made of polyethylene glycol isodecyl ether, polyethylene glycol isotridecyl ether, and polyethylene glycol trimethylnonyl ether containing from 3 to 15 ethylene oxide units per molecule.

As nonionic surfactants, mention may also be made of silicone nonionic surfactants and, in particular, polyether silicones. These surfactants are also known under the name of organopolysiloxane-polyether copolymers. Preferably, it is an organopolysiloxane-polyoxyalkylene copolymer comprising siloxyl units bearing ethylene oxide chain sequences, and, optionally, propylene oxide chain sequences.

Other examples of surfactants include: ionic, nonionic or amphoteric fluoro surfactants and mixtures thereof, for example:

perfluoroalkyls,
perfluorobetaines,
ethoxylated polyfluoro alcohols,
ammonium polyfluoroalkyls,
surfactants, the hydrophilic part of which contains one or more saccharide units containing from five to six carbon atoms and the hydrophobic part of which contains a unit of formula $R^f(CH_2)_n$—, in which n=2 to 20 and $R^f$ represents a perfluoroalkyl unit of formula $C_mF_{2m+1}$, in which m=1 to 10; and
polyelectrolytes bearing fatty perfluoroalkyl side groups.

The term "fluorinated surfactant" means, as is perfectly known per se, a compound formed of an aliphatic perfluorocarbon part, comprising at least three carbon atoms, and an ionic, nonionic or amphoteric hydrophilic part. The perfluorocarbon part of at least three carbon atoms may represent either all or only a fraction of the fluorocarbon part of the molecule. There are a large number of references in the literature as regards this type of compound. A person skilled in the art may notably refer to the following references FR-A-2 149 519, WO-A-94 21 233, U.S. Pat. No. 3,194,767, the book Fluorinated Surfactants, Erik Kissa, published by Marcel Dekker Inc. (1994) Chapter 4, notably Tables 4.1 and 4.4.

Mention may be made in particular of the products sold by the company DuPont under the name Zonyl®, for example FSO, FSN-100, FS-300, FSD, and also the fluorinated surfactants of the name Forafac® distributed by the company DuPont and the products sold under the name Fluorad® by the company 3M.

Among these surfactants, mention may be made in particular of anionic, cationic, nonionic and amphoteric perfluoroalkyl compounds, and among them, more particularly, the surfactants of the Zonyl® class, sold by DuPont under the names Zonyl® FSA, Zonyl® FSO, Zonyl® FSC and Zonyl® FSK, respectively.

The following may further be pointed out in this regard:
Zonyl® FSO 100: CAS 65545-80-4, (nonionic) 99% to 100%, the remainder being 1,4-dioxane
Zonyl® FSN: CAS 65545-80-4, 99% to 100%, the remainder being sodium acetate and 1,4-dioxane
Zonyl® FS-300: CAS 65545-80-4, 40%, the remainder being 1,4-dioxane (<0.1%) and water
Zonyl® FSD: CAS 70983-60-7 30%, (cationic), the remainder being hexylene glycol (10%), sodium chloride (3%) and water (57%).
Mention may also be made of:
perfluoroalkyl betaines (amphoteric) such as the product sold by DuPont under the name Forafac® 1157,
ethoxylated polyfluoro alcohols (nonionic), such as the product sold by DuPont under the name Forafac 1110 D, polyfluoroalkyl ammonium salts (cationic), such as the product sold by DuPont under the name Forafac 1179,
surfactants whose hydrophilic part contains one or more saccharide units containing from 5 to 6 carbon atoms (units derived from sugars such as fructose, glucose, mannose, galactose, talose, gulose, allose, altose, idose, arabinose, xylose, lyxose and/or ribose) and whose hydrophobic part contains a unit of formula $R^F(CH_2)n$, where n may range from 2 to 20, preferably from 2 to 10, and $R^F$ represents a perfluoroalkyl unit of formula $C_mF_{2m+1}$ with m possibly ranging from 1 to 10, preferably from 4 to 8, chosen from those having the characteristics defined above; mention may be made of the monoesters of perfluoroalkyl fatty acids and of sugars such as sucrose, the monoester function possibly being represented by the formula $R_F(CH_2)_nC(O)$, where n may range from 2 to 10 and $R^F$ represents a perfluoroalkyl unit of formula $C_mF_{2m+1}$ with m possibly ranging from 4 to 8, described in Journal of the American Oil Chemists' Society (JAOCS), Vol. 69, No. 1, January 1992) and chosen from those having the characteristics defined above; and
polyelectrolytes bearing perfluoroalkyl fatty side groups such as polyacrylates having $R^F(CH_2)_n$ groups where n may be from 2 to 20, preferably from 2 to 10 and $R^F$ represents a perfluoroalkyl unit of formula $C_mF_{2m+1}$ with m being from 1 to 10, preferably from 4 to 8, chosen from those having the characteristics defined above; mention may be made of the polyacrylates containing —$CH_2C_7F_{15}$ groups described in J. Chim. Phys. (1996) 93, 887-898 and chosen from those having the characteristics defined above.

The amount of surfactant (B) depends on the type of each of the constituents present and on the very nature of the surfactant used. As a general rule, the emulsion comprises from 0.5% to 10% by weight of surfactant relative to the total weight of the emulsion.

The colored lubricant mold-release composition (I) also comprises a non-fluorescent pigment (C).

The term "pigment" means any colored substance. In the context of the present invention, the term "pigment" is to be taken in a broad sense and includes dyes. In general, pigments are insoluble in the medium they color.

The term "non-fluorescent" refers to a compound that is incapable of absorbing light energy and of re-emitting it in the form of light.

Preferably, the non-fluorescent pigment (C) is chosen from the group consisting of (according to the Colour Index classification): monoazo, disazo, amino ketone, indigoid, phthalocyanine, oxazine, inorganic, and mixtures thereof, preferably in the form of an aqueous dispersion.

The Colour Index (CI) classification is well known to those skilled in the art. It is a reference database published by the Society of Dyers and Colourists and the American Association of Textile Chemists and Colorists. This database references manufactured colors and associated products. The products are listed according to names (Colour Index Generic Name, CIGN) and generic numbers (Colour Index Constitution Number, CICN).

The generic numbers associated with the non-fluorescent pigments (C) are the following: monoazo (CICN 11000-19999), disazo (CICN 20000-29999), amino ketone (CICN 56000-56999), indigoid (CICN 73000-73999), phthalocyanine (CICN 74000-74999), oxazine (CICN 51000-51999), inorganic (CICN 77000-77999).

Preferably, the non-fluorescent pigment (C) is organic, and is chosen from the group consisting of (according to the Colour Index classification): monoazo, disazo, amino ketone, indigoid, phthalocyanine, oxazine, and mixtures thereof.

Preferably, the non-fluorescent pigment (C) is chosen from the group consisting of (according to the Colour Index classification): monoazo, disazo and phthalocyanine, and mixtures thereof. More preferentially, the non-fluorescent pigment (C) is chosen from the group consisting of (according to the Colour Index classification): monoazo and disazo.

Advantageously, the non-fluorescent pigment (C) is chosen from red, yellow, orange, green, blue and violet pigments and mixtures thereof. Preferably, the non-fluorescent pigment (C) is chosen from red, yellow and orange pigments.

According to a particular embodiment, the non-fluorescent pigment (C) may be the pigment Yellow 3 (PY3, CICN 11710) or the pigment Red 2 (PR2, CICN 12310).

The non-fluorescent pigment (C) is preferably in the form of an aqueous dispersion. Among the non-fluorescent pigments (C) in the form of an aqueous dispersion, mention may be made of those sold under the name Aquacolors by the company Sioen.

The colored lubricant mold-release composition (I) may comprise between 0.01% and 3% by weight and preferably between 0.1% and 2.5% by weight of non-fluorescent pigment (C) relative to the total weight of composition (I). A person skilled in the art will know how to adjust the amount of pigment according to its nature and the thickness of the desired coating. In particular, a person skilled in the art will know how to adjust the amount of pigment so that the initial contrast on the tire is sufficient and so that the coating is visible to the naked eye.

The colored lubricant mold-release composition (I) may also further comprise (i) at least one crosslinking agent (G) containing, per molecule, at least three ≡SiH units, and/or (ii) a catalyst (H).

Preferably the crosslinking agent (G) of the mold-release composition (I) is an organopolysiloxane chosen from those bearing at least one unit of formula (II) and terminated with units of formula (III) or rings consisting of units of formula (II) represented below:

[Chem. 1]

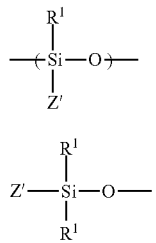

(II)

(III)

in which:
the symbols $R^1$, are identical or different and represent:
a. a linear or branched alkyl radical containing 1 to 8 carbon atoms, which is unsubstituted or substituted with at least one fluorine,
b. a cycloalkyl radical containing between 5 and 8 ring carbon atoms,
c. an aryl radical containing between 6 and 12 carbon atoms, or
d. an aralkyl radical bearing an alkyl part containing between 7 and 14 carbon atoms and an aryl part containing between 6 and 12 carbon atoms, which is unsubstituted or substituted on the aryl part with halogens, alkyls and/or alkoxys containing 1 to 3 carbon atoms,
the symbols Z' are identical or different and represent:
a. a hydrogen radical, or
b. a group corresponding to the same definition as that given above for $R^1$,
and with, per molecule, at least three of the symbols Z' representing a hydrogen radical H.

As an example of a crosslinking agent (G), mention may be made of the compound of formula (IV) below:

[Chem. 2]

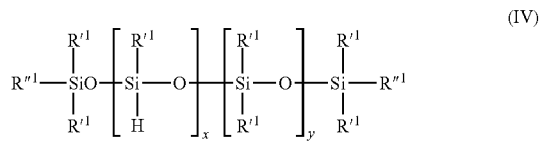

(IV)

in which:
x represents an integer or fractional number ranging between 1 and 10 000,
y is an integer or fractional number ranging between 0 and 10 000,
$R'^1$ and $R''^1$ represent, independently of each other:
a. a linear or branched alkyl radical containing 1 to 8 carbon atoms, which is unsubstituted or substituted with at least one halogen, preferably fluorine, the alkyl radicals preferably being methyl, ethyl, propyl, octyl and 3,3,3-trifluoropropyl;
b. a cycloalkyl radical containing between 5 and 8 ring carbon atoms,
c. an aryl radical containing between 6 and 12 carbon atoms, or
d. an aralkyl radical bearing an alkyl part containing between 5 and 14 carbon atoms and an aryl part containing between 6 and 12 carbon atoms, which is unsubstituted or substituted on the aryl part,
$R'''^1$ may also correspond to hydrogen, and
with the proviso that the organopolysiloxane comprises at least three ≡SiH units.

The following compounds are most particularly suitable for use in the invention as crosslinking agent (G):

[Chem. 3]

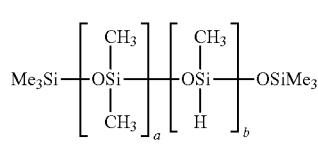

(S1)

[Chem. 4]

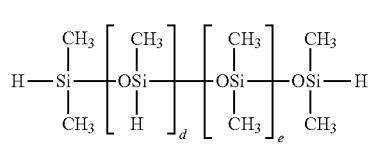

(S2)

with a, b, d and e representing a number ranging from:
in the polymer of formula S1:
0≤a≤10 000 preferably 0≤a≤8000, preferably 0≤a≤5000, and 3≤b≤10000, preferably 10≤b≤100, preferably 20≤b≤60
in the polymer of formula S2:
1≤d≤10 000, preferably 20≤d≤60, and 0≤e≤10000, preferably 0≤e≤1000.

The organopolysiloxanes of the colored lubricant mold-release composition (I) may be polymerizable and/or crosslinkable (i) by polycondensation, in the case where the composition comprises a reactive organopolysiloxane (F) including, per molecule, at least two ≡SiOH silanol groups, or (ii) by dehydrogenation-condensation, in the case where the composition comprises a reactive organopolysiloxane (F) including, per molecule, at least two ≡SiOH silanol groups and a crosslinking agent (G) bearing, per molecule, at least three ≡SiH units (≡SiH+≡SiOH→≡Si—O—Si≡+H$_2$ (g)).

For this purpose, at least one catalyst (H) may be used. The catalyst may be a polycondensation catalyst or a dehydrogenation-condensation catalyst (H). The presence of the catalyst is only optional due to the temperatures encountered in the context of the application.

Examples of polycondensation or dehydrogenation-condensation catalysts that may be used in the context of the invention are organometallic salts, and titanates such as tetrabutyl orthotitanate.

As organometallic salts, mention may be made of zirconium naphthenate and zirconium octylate.

Use may also be made of a catalytic tin compound, generally an organotin salt. Organotin salts that may be used are described in particular in Noll's Chemistry and Technology of Silicones, Academic Press (1968), page 397. Distannoxanes, polyorganostannoxanes or the reaction product of a tin salt, in particular a tin dicarboxylate, with ethyl polysilicate, as described in patent U.S. Pat. No. 3,862,919, may also be defined as catalytic tin compounds.

The reaction product of an alkyl silicate or of an alkyltrialkoxysilane with dibutyltin diacetate as described in Belgian patent BE-A-842305 may also be suitable for use.

According to another possibility, a tin II salt, such as SnCl$_2$ or stannous octoate, may be used. The catalyst may be a tin salt of an organic acid, such as dibutyltin diacetate, dibutyltin dilaurate, dioctyltin dilaurate, dibutyltin dioctate, cobalt octylate and dioctyltin di(isomercaptoacetate). Examples of tin salts such as tin bischelates are described in patent applications EP-A-147323 and EP-A-235049, diorganotin dicarboxylates and, in particular, the catalysts are described in British patent GB-A-1 289 900 (dibutyltin or dioctyltin diacetate, dibutyltin or dioctyltin dilaurate).

Tin-free catalysts are also described in patent applications WO 2010/146253, WO 2010/146254, WO 2010/149869, WO 2010/149870 and WO 2013/004926.

The catalyst (H), when it is present, is generally introduced into the emulsion in a proportion of from 0.05 to 5 parts by weight, relative to the total weight of the emulsion.

The colored lubricant mold-release composition (I) may also comprise an air scavenger (J). Among the air scavengers, mention may be made of micas, talc, carbon black, and glass beads.

According to a preferred embodiment, the air scavenger (J) is glass beads.

The chemical composition of the glass beads may be of soda-lime or borosilicate type. The majority of the industrially manufactured glass is soda-lime glass. This type is mainly composed of 71% to 75% sand (SiO$_2$), 12% to 16% soda (Na$_2$O) and 8% to 15% limestone (CaO). Borosilicate glasses are distinguished from soda-lime glasses by the presence of boron oxide (B$_2$O$_3$) and aluminum oxide (Al$_2$O$_3$).

Glass is an amorphous, i.e. non-crystalline, material. As a result, it presents significant structural disorder. Its microscopic structure is such that there is no long-range order in a glass.

These are solid glass beads, i.e. not hollow. They may be surface-coated with silane coupling agents.

Preferably, the glass beads have the following features:
a mean particle diameter measured according to the standard ISO 13320 of between 0.1 and 150 µm,
a bulk density measured according to ASTM D 3101-78 of between 1000 and 2000 kg/m$^3$, and
an oil absorption measured according to ASTM D-1483 of between 10 and 30 g of oil per 100 g of spheres.

Even more preferentially, the glass spheres (D) have the following features:
a mean particle diameter measured according to the standard ISO 13320 of between 0.5 and 100 µm,
a bulk density according to ASTM D 3101-78 of between 1200 and 1800 kg/m$^3$, and
an oil absorption according to ASTM D-1483 of between 15 and 25 g of oil per 100 g of spheres.

Even more preferentially, the glass beads (D) have a mean diameter measured according to the standard ISO 13320 of between 12 and 70 µm.

The presence of glass beads makes it possible to obtain good air evacuation during vulcanization.

The amount of air scavenger (J), and in particular of glass beads, in the mold-release composition (I) ranges between 0.1% and 20% by weight and preferably between 0.1% and 15% by weight relative to the total weight of the composition.

Moreover, in a conventional and nonlimiting manner, additives (K) such as film-forming polymers, antifoams, biocides, rheology modifiers, coalescers, dispersants, acidifying agents, neutralizing agents, bases and/or thickening agents, alone or as a mixture, may also be used in the colored lubricant mold-release composition (I).

The concentrations of such adjuvants are known to those skilled in the art.

Water (D) is present in the colored lubricant mold-release composition (I), preferably in proportions of between 20% and 90% and preferably between 30% and 80% by weight relative to the total weight of the composition.

The colored lubricant mold-release composition (I) may have a loss of color (X) of between 85% and 100%, after the composition has been deposited on an expandable vulcanization bladder or on a green tire and heat-treated at 170° C. for 20 minutes, the loss of color (X) being determined by spectrocolorimetry in the following manner:

$$X = 100 * \left| \frac{\text{final Delta } E - \text{initial Delta } E}{\text{initial Delta } E} \right| \qquad \text{[Math. 3]}$$

Preferably, the loss of color (X) is between 90% and 100%.

The initial delta E is the color difference between (i) the coated bladder or tire (E) and (ii) the uncoated bladder or tire. The final delta E is the color difference between (i) the coated bladder or tire (E) after heat treatment and (ii) the uncoated bladder or tire.

According to another embodiment, the colored lubricant mold-release composition (I) comprises
from 0.1 to 60 parts by weight and preferably from 0.1 to 30 parts by weight of at least one polyorganosiloxane (A),
from 0.1 to 10 parts by weight of at least one surfactant (B),
from 0.01 to 3 parts by weight of at least one non-fluorescent pigment (C),
from 20 to 90 parts by weight and preferably from 30 to 80 parts by weight of water (D),
from 0 to 20 parts by weight of at least one crosslinking agent (G),
from 0 to 5 parts by weight of at least one catalyst (H),
from 0 to 20 parts by weight and preferably from 0.1 to 15 parts by weight of an air scavenger (J), from 0 to 5 parts by weight of at least one additive (K), per 100 parts by weight of the sum of the components (A), (B), (C), (D), (G), (H), (J), and (K).

The compositions according to the invention are stable over time and the silicone coatings prepared from the compositions according to the invention have good lubrication properties (Kd<0.7), and good air evacuation when the composition comprises glass beads. In the case of multiple demolding, the compositions according to the invention show good resistance to successive demolding.

Lubrication Process

Another subject of the present invention relates to a process for lubricating (P1) an expandable rubber bladder that is useful during vulcanization of a green tire in a metal press, characterized in that the outer surface of said bladder to be brought into contact with the inner face of said green tire is coated with a mold-release composition (I) in the form of an oil-in-water emulsion.

Another subject of the present invention relates to a process for lubricating (P2) an expandable rubber bladder that is useful in a vulcanization of a green tire in a metal press, characterized in that, in a first step outside the press, the inner surface of said green tire is coated with a mold-release composition (I) in the form of oil-in-water emulsion.

The mold-release composition (I) may be used at each molding/demolding cycle (single demolding) or after several molding/demolding cycles (multiple demolding). In the case of multiple demolding, the number of green tire molding and cured tire demolding cycles is greater than or equal to 3.

The methods for applying the treatments are well known to a person skilled in the art. In particular, they may be applied by brush or sponge, or by spraying.

Application by spraying may be performed in several passes so as to ensure that the coating is uniform and homogeneous.

More particularly, the invention relates to
an expandable rubber bladder coated on its outer surface with a composition (I) according to the invention, for forming and vulcanizing green tires,
an expandable rubber bladder which may be obtained by heating the expandable bladder defined above, notably to between 80 and 220° C., preferably between 150 and 200° C.,
a green tire coated on its inner surface with a lubricant composition (I) according to the invention, and
a vulcanized tire, which may be obtained by heating the green tire defined above, notably to between 80 and 220° C., preferably between 150 and 200° C.

Other advantages and features of the present invention will become apparent on reading the following examples, which are given by way of illustration and are in no way limiting.

EXAMPLES

Starting Materials Used

Bluesil® Emulsion 211—from the company Elkem Silicones: polydimethylsiloxane oil emulsion (A) comprising a surfactant (B), the viscosity of the oil being approximately 350 mPa·s at 25° C.

Bluesil® Emulsion 284—from the company Elkem Silicones: α,ωbis(hydroxy)polydimethylsiloxane oil emulsion (A) comprising a surfactant (B), the viscosity of the oil being approximately 135 000 mPa·s at 25° C.

Bluesil® Emulsion 247G—from the company Elkem Silicones: emulsion of a mixture of α,ω-bis(hydroxy)polydimethylsiloxane gum (A), with a consistency of approximately 700 expressed in tenths of a millimeter at 25° C., and of polydimethylsiloxane oil (A) with a viscosity of approximately 50 mPa·s at 25° C., and comprising a surfactant (B)

Lyndcoat® BR 2430—sold by the company Elkem Silicones: lubricant emulsion

GlassyCoat® $C_3$ SP 20-60 TO sold by the company Sovitec:
uncoated glass beads D50 15-30 μm: air scavenger (J)

Rhodopol® 23 sold by the company Solvay Novecare: Xanthan gum, thickener (K)

Imbentin® T/030 sold by the company Dr Kolb: Isotrideceth 3, wetting agent (K)

Silcolapse® 5020 sold by the company Elkem Silicones: antifoaming emulsion (K)

Sorbic acid (K)

Proxel® GXL sold by the company Arch Chemicals: 1,2-benzisothiazolin-3-one, biocide (K)

Aquacolors Yellow 60118 sold by the company Sioen: Aqueous pigment preparation (Colour Index PY 3, 11710) 51% Pigment (C)

Aquacolors Red 62153 sold by the company Sioen: Aqueous pigment preparation (Colour Index PR 2, 12310) 44% Pigment (C)

CT ML 8181 sold by the company Chem-Trend: Mold-release agent

Lubricant Mold-Release Compositions

The various lubricant mold-release compositions tested are summarized in Tables 1 and 2. The amounts are expressed in parts by weight.

TABLE 1

| Composition | Example 1 | Example 2 | Example 3 | Example 4 | Example 5 | Comp. Example 1 | Comp. Example 2 |
|---|---|---|---|---|---|---|---|
| Part A | | | | | | | |
| Water 1 | 35.9 | 35.9 | 35.9 | 35.9 | 35.9 | 35.9 | 35.9 |
| Rhodopol 23 | 0.33 | 0.33 | 0.33 | 0.33 | 0.33 | 0.33 | 0.33 |
| Part B | | | | | | | |
| Water 2 | 38 | 38 | 38 | 38 | 38 | 38 | 38 |
| Silcolapse 5020 | 0.27 | 0.27 | 0.27 | 0.27 | 0.27 | 0.27 | 0.27 |
| Sorbic acid | 0.08 | 0.08 | 0.08 | 0.08 | 0.08 | 0.08 | 0.08 |
| GlassyCoat $C_3$ SP 20-60 TO | 10 | 10 | 10 | 10 | 0 | 10 | 10 |

TABLE 1-continued

| Composition | Example 1 | Example 2 | Example 3 | Example 4 | Example 5 | Comp. Example 1 | Comp. Example 2 |
|---|---|---|---|---|---|---|---|
| Part C | | | | | | | |
| Emulsion 211 | 12.6 | / | / | / | 12.6 | 12.6 | / |
| Emulsion 284 | 0 | 13 | 6 | 6 | / | / | 6 |
| Emulsion 247 G | 0 | 0 | 6.5 | 6.5 | / | / | 6.5 |
| Proxel GXL | 0.15 | 0.15 | 0.15 | 0.15 | 0.15 | 0.15 | 0.15 |
| Imbentin T/030 | 0.8 | 0.8 | 0.8 | 0.8 | 0.8 | 0.8 | 0.8 |
| Aquacolors Yellow | 2 | 2 | 2 | / | 2 | / | / |
| Aquacolors Red | / | / | / | 0.5 | / | / | / |
| Characteristics | | | | | | | |
| Brookfield viscosity at 23° C. (mPa · s) | 1680 | 1530 | 1570 | 1680 | 1670 | 1860 | 1790 |
| pH | 4.9 | 4.93 | 5.04 | 4.92 | 4.67 | 4.98 | 5.18 |
| Solids content (1 g, 30 min at 150° C.) | 19.69 | 18.94 | 18.64 | 17.72 | 10.67 | 18.81 | 17.48 |

The emulsions in Table 1 are prepared as follows:

Preparation of Part A: pouring a first fraction of water ("water 1") into a 1 liter beaker, followed by adding Rhodopol 23 as a spray with stirring at 20 000 rpm using a Charvet disperser equipped with a 35-mm diameter deflocculating turbine. Stirring for 20 minutes, the viscosity of the aqueous solution increases then stabilizes.

Preparation of part B: Introduction into a second 1-liter beaker of the second water fraction ("water 2"), Silcolapse antifoam, sorbic acid and, where appropriate, glass beads (GlassyCoat™). Stirring at 10 000 rpm with the same Charvet disperser equipped with its 35-mm diameter deflocculating turbine. Followed by addition of the previous part A, which is dispersed at 20 000 rpm for 20 min.

Preparation of part C: with moderate stirring (140 rpm with a scraping anchor 85 mm in diameter), introduction into a new 1 liter beaker of the silicone emulsion (emulsion 211, or emulsion 284, or emulsion 284 and then emulsion 247G) which is mixed with the biocide (Proxel), and then with additional surfactant (Imbentin T/030 from Dr. Kolb), and finally the pigment. Homogenization for about one hour under the same stirring conditions.

Finalization of the lubricant mold-release composition: by pouring dispersion B (containing part A) into mixture C, followed by moderate stirring for 10 minutes.

TABLE 2

| Composition | Example 6 | Example 7 | Example 8 |
|---|---|---|---|
| CT ML 8181 | 98 | / | / |
| Lyndcoat BR²430 | / | 99 | 98 |
| Aquacolor Yellow | 2 | 1 | 2 |
| Characteristics | | | |
| Brookfield viscosity at 23° C. (mPa · s) | ND | 1600 | 1600 |
| pH | ND | 5 | 5 |
| Solids content | ND | 27 | 27 |

ND: not determined

The compositions in Table 2 were prepared by mixing the compositions CT ML 8181 or Lyndcoat BR2430 with the pigment, with stirring.

The properties of the compositions prepared were then tested.

Mold Release Test

The durability of a lubricant composition corresponds to the number of tires made without degradation of the expandable bladder surface.

To do this, a film of expandable bladder, coated beforehand with the lubricant mold-release composition to be evaluated, is pressed into contact with a film of unvulcanized tire casing, according to a series of pressure and temperature cycles simulating the manufacturing steps of a tire on the industrial tool.

In detail, a rubber sheet, of composition identical to that of the bladder and of size 2 mm×80 mm×80 mm is prepared in a heated press at 200° C. for 30 minutes. The sheet is surface-structured to simulate the surface of a bladder.

The sheet is coated in a spray booth by spraying the mold-release composition with a compressed air gun. A layer of about 20 μm is applied. After air-drying for 1 hour, the whole is baked at 170° C. for at least is 10 minutes.

The coated sheet is placed in a metal mold in a press. The plates are heated to 170° C. The sheet is allowed to preheat for 5 minutes, and then a piece of raw ILR (Inner Liner Rubber (ILR)=rubber that makes up the inner surface of a green tire) about 9 cm thick is placed on the sheet coated with the mold-release composition. The mold is closed, then the press, and the ILR rubber is cured for 7 minutes at 170° C. The mold is opened and the thin molded ILR sheet is removed.

To be considered successful demolding, it must separate without forcing or snagging. Otherwise, the demolding is noted as having failed.

The number of demoldings corresponds to the number of ILR sheets demolded without snagging. The results are presented in tables 3 and 4.

Slipping Test

The object of this test is to assess the slipperiness of a mold-release composition placed at the interface between the expandable bladder and the inner surface of a tire casing.

This test is performed by sliding a metal pad of a given weight, under which a tire casing film (50×75 mm) is attached, over a rubber surface, the composition of which is that of the expandable bladder.

The rubber surface is coated beforehand with the colored lubricant mold-release composition. After application of the composition, the rubber surface is allowed to dry for 1 hour at ambient temperature and is then heated for 10 minutes at 170° C. in a ventilated oven.

The dynamic friction coefficient is measured using a dynamometer (at a speed of 50 mm/min). Five successive passes are performed on the same expandable bladder sample, changing the tire casing sample each time.

The coefficient of friction (Kd) corresponds to $$Kd \text{ (dimensionless)} = \frac{\text{mean force to move the pad (in } N)}{\text{pad weight (in } N)} \quad \text{[Math. 4]}$$

The Kd value mentioned in tables 3 and 4 corresponds to the mean of the values obtained in the five passes.

The lower the values of the coefficient of friction, the better the sliding properties of the lubricant composition.

This sliding test is perfectly representative of the performance to be achieved on the industrial tool, and is a first selection criterion. The results are presented in tables 3 and 4.

Colorimetry Test

The color of rubber specimens coated with colored lubricant mold-release compositions is characterized with a GretagMacbeth™ brand spectrocolorimeter, ref. ColorEye® XTH. The values of L, La, Lb and delta E are measured.

This is a colorimetric reflection measurement taken relative to a white reference, and compared to the uncoated (black) rubber support which also serves as a reference (and zero point for La and Lb values).

First, a preliminary calibration with a white reference is performed. Next, a reference sample (black rubber support, not coated with silicone) is measured and a sample (rubber coated with the colored lubricant mold-release composition) is measured before and after heat treatment at 170° C. for 20 minutes. The measurements are repeated five times and the means are calculated. The loss of color (X) is determined by spectrocolorimetry in the following manner:

$$X = 100 * \left| \frac{\text{final Delta } E - \text{initial Delta } E}{\text{initial Delta } E} \right| \quad \text{[Math. 5]}$$

The results obtained are presented in tables 3 and 4.

TABLE 3

|  | Example 1 | Example 2 | Example 3 | Example 4 | Example 5 | Comp. Example 1 | Comp. Example 2 |
|---|---|---|---|---|---|---|---|
| Dry deposit for color measurements (g/m²) | 21 | 20 | 16 | 17 | 19 | 17 | 16 |
| Colorimetry measurements before heat treatment | | | | | | | |
| L (before heat treatment) | 40.08 | 42.62 | 31.94 | 24.74 | 49.33 | 22.27 | 23.04 |
| La (before heat treatment) | −16.7 | −17.6 | −11.16 | 7.01 | −21.6 | −0.2 | −0.02 |
| Lb (before heat treatment) | 23.97 | 27.29 | 12.3 | 6.25 | 32.76 | 0.18 | −0.01 |
| Initial Delta E (before heat treatment) | 23.83 | 37.93 | 20.75 | 9.54 | 46.88 | 0.86 | 1.4 |
| Colorimetry measurements after heat treatment | | | | | | | |
| L (after heat treatment) | 23.08 | 27.27 | 22.36 | 24.84 | 23.64 | 22.55 | 23.94 |
| La (after heat treatment) | −0.47 | −0.3 | −0.02 | 0.07 | −0.33 | −0.15 | 0 |
| Lb (after heat treatment) | 0.55 | 0.68 | −0.13 | 0.45 | −0.01 | 0.7 | 0.4 |
| Final Delta E (after heat treatment) | 0.74 | 0.83 | 1.41 | 0.7 | 0.43 | 0.97 | 0.91 |
| Change in Delta E after heat treatment | −23.09 | −37.1 | −19.34 | −8.84 | −46.45 | 0.11 | −0.49 |
| Loss of color (X) (%) | 96.9 | 97.8 | 93.2 | 92.6 | 99.1 | 12.8 | 35 |
| Mold-release test | | | | | | | |
| Dry deposit for mold-release test (g/m²) | 13 | 13 | 13 | 13 | 13 | 13 | 13 |
| Demolding (number) | 1 | 1 | 1 | 1 | 1 | 1 | 1 |
| Sliding test | | | | | | | |
| Dry deposit for lubrication test (g/m²) | 16 | 17 | 17 | 16 | 16 | 14 | 16 |
| Dynamic friction coefficient Kd (mean over 20 pad passes) | 0.1 | 0.09 | 0.09 | 0.09 | 0.34 | 0.09 | 0.1 |

TABLE 4

|  | Example 6 | Example 7 | Example 8 |
|---|---|---|---|
| Dry deposit for color measurements (g/m$^2$) | 33 | 22 | 22 |
| Colorimetry measurements before heat treatment | | | |
| L (before heat treatment) | 49.36 | 31.94 | 28.44 |
| La (before heat treatment) | −21.3 | −11.04 | −16.5 |
| Lb (before heat treatment) | 33.75 | 10.75 | 19.69 |
| Initial Delta E (before heat treatment) | 47.46 | 18.94 | 31 |
| Colorimetry measurements after heat treatment | | | |
| L (after heat treatment) | 23.27 | 21.67 | 21.82 |
| La (after heat treatment) | −0.93 | 0.09 | −0.03 |
| Lb (after heat treatment) | 0.8 | −0.68 | −0.65 |
| Final Delta E (after heat treatment) | 1.43 | 0.38 | 0.43 |
| Change in Delta E after heat treatment | −46.03 | −18.56 | −30.57 |
| Loss of color (X) (%) | 97.0 | 98.0 | 96.6 |
| Mold-release test | | | |
| Dry deposit for mold-release test (g/m$^2$) | ND | 20 | 20 |
| Demolding (number) | ND | 11 | 12 |
| Sliding test | | | |
| Dynamic friction coefficient Kd (mean over 20 pad passes) | ND | 0.3 | 0.3 |

ND = not determined

These results show that the compositions according to the invention can be visualized with the naked eye on a black tire, since the delta E before heat treatment is greater than 5. Furthermore, a loss of color (X) of at least 90% is observed after heat treatment; the compositions according to the invention thus do not degrade the appearance of the vulcanized tire, the vulcanized tire remaining black after heat treatment.

Moreover, it is possible to use the composition according to the invention for multiple demolding (Examples 7 and 8).

The presence of a pigment does not modify the dynamic friction coefficient Kd (Examples 1 and 3 and Comparative Examples 1 and 2). Moreover, the presence of glass beads affords a better dynamic friction coefficient (Examples 1 and 5).

The invention claimed is:

1. A colored lubricant mold-release composition (I) comprising:
   a. at least one organopolysiloxane (A); selected from the group consisting of:
      non-reactive organopolysiloxanes (E) which, per molecule, comprise monovalent organic substituents, that are identical or different, bonded to the silicon atoms, and that are selected from the group consisting of $C_1$-$C_{40}$ alkyl, $C_3$-$C_8$ cycloalkyl, $C_6$-$C_{10}$ aryl and $C_7$-$C_{50}$ alkylaryl radicals;
      reactive organopolysiloxanes (F) including at least two ≡SiOH silanol groups per molecule;
      and mixtures thereof,
   b. at least one surfactant (B),
   c. at least one non-fluorescent pigment (C) selected from the group consisting of, according to the color Index classification: monoazo, disazo, amino ketone, indigoid, phthalocyanine, oxazine, and mixtures thereof; and
   d. water (D);
   wherein amounts of the surfactant(s) and the water are sufficient to obtain an oil-in-water emulsion such that the colored lubricant mold-release composition (I) is in the form of an oil-in-water emulsion.

2. The composition (I) as claimed in claim 1, wherein, the composition exhibits a loss of color (X) of between 85% and 100%, after the composition has been deposited on an expandable vulcanization bladder and/or on a green tire and heat-treated at 170° C. for 20 minutes, wherein the loss of color (X) is determined by spectrocolorimetry in the following manner:

$$X = 100 * \left| \frac{\text{final Delta } E - \text{initial Delta } E}{\text{initial Delta } E} \right|. \quad \text{[Math. 1]}$$

3. The composition (I) as claimed in claim 1, wherein the composition comprises between 0.01% and 3% by weight of non-fluorescent pigment (C) relative to the total weight of composition (I).

4. The composition (I) as claimed in claim 1, wherein the composition further comprises (i) at least one crosslinking agent (G) comprising, per molecule, at least three ≡SiH units, and/or (ii) a catalyst (H).

5. The composition (I) as claimed in claim 1, wherein the composition further comprises an air scavenger (J).

6. The composition (I) as claimed in claim 1, wherein the composition comprises
   from 0.1 to 60 parts by weight of at least one polyorganosiloxane (A),
   from 0.1 to 10 parts by weight of at least one surfactant (B),
   from 0.01 to 3 parts by weight of at least one non-fluorescent pigment (C),
   from 20 to 90 parts by weight of water (D),
   from 0 to 20 parts by weight of at least one crosslinking agent (G),
   from 0 to 5 parts by weight of at least one catalyst (H),
   from 0 to 20 parts by weight of an air scavenger (J),
   from 0 to 5 parts by weight of at least one additive (K),
   per 100 parts by weight of the sum of the constituents (A), (B), (C), (D), (G), (H), (J), and (K).

7. The composition (I) as claimed in claim 1, wherein the non-fluorescent pigment (C) is in the form of an aqueous dispersion.

8. The composition (I) as claimed in claim 3, wherein the non-fluorescent pigment (C) is present in an amount of from about 0.1% to about 2.5% by weight.

9. The composition (I) as claimed in claim 6, wherein the at least one polyorganopolysiloxane (A) is present in an amount of from about 0.1 parts by weight to about 30 parts by weight.

10. The composition (I) as claimed in claim 6, wherein the water (D) is present in an amount of from about 30 parts by weight to about 80 parts by weight.

11. The composition (I) as claimed in claim 6, wherein the air scavenger (J) is present in an amount of from about 0.1 parts by weight to about 15 parts by weight.

12. A process of lubricating (P1) an expandable rubber bladder that is useful in the vulcanization of a green tire in a metal press, the process comprising bringing the outer surface of the bladder into contact with an inner face of the green tire that is coated with the colored lubricant mold-release composition (I) as claimed in claim 1, and wherein the process results in the expandable rubber bladder being lubricated on its outer surface.

13. A process of lubricating (P2) an expandable rubber bladder that is useful during the vulcanization of a green tire in a metal press, the process comprising in a first step outside the press, of coating the inner surface of the green tire with the colored lubricant mold-release composition (I) as claimed in claim 1; the step thus producing a green tire whose inner surface is coated with the composition (I); and in a subsequent step in the metal press, the green tire whose inner surface is coated with composition (I) is placed in contact with an expandable rubber bladder; the process thus producing by transfer an expandable rubber bladder that is lubricated on its outer face.

14. An expandable rubber bladder or green tire, coated with a colored lubricant mold-release composition (I) as claimed in claim 1.

15. A process of vulcanizing a green tire in a metal press using an expandable rubber bladder, the process comprising the following steps:
  1. coating an inside surface of the green tire and/or an outside surface of the expandable rubber bladder with a colored lubricant mold-release composition (I), in the form of an oil-in-water emulsion, to form a colored coating that is visible to the naked eye on the green tire and/or on the bladder, the lubricant composition (I) comprising:
    a. at least one organopolysiloxane (A) selected from the group consisting of:
      non-reactive organopolysiloxanes (E) which, per molecule, comprise monovalent organic substituents, that are identical or different, bonded to the silicon atoms, and that are selected from the group consisting of $C_1$-$C_{40}$ alkyl, $C_3$-$C_8$ cycloalkyl, $C_6$-$C_{10}$ aryl and $C_7$-$C50$ alkylaryl radicals;
      reactive organopolysiloxanes (F) including at least two=SiOH silanol groups per molecule;
      and mixtures thereof;
    b. at least one surfactant (B);
    c. at least one non-fluorescent pigment (C) selected from the group consisting of, according to the color Index classification: monoazo, disazo, amino ketone, indigoid, phthalocyanine, oxazine, and mixtures thereof; and
    d. water (D);
  wherein amounts of the surfactant(s) and the water are sufficient to obtain the oil-in-water emulsion such that the colored lubricant mold-release composition (I) is in the form of an oil-in-water emulsion;
  2. inflating the bladder and vulcanizing the tire in the metal press; and
  3. demolding the tire;
  wherein an interior of the tire obtained in step 3) no longer has any coloring that is visible to the naked eye.

16. The process as claimed in claim 15, wherein the colored coating that is visible to the naked eye on the green tire and/or on the bladder obtained in step 1) has a loss of color (X) of from about 85% to about 100%, between step 1) and step 3), wherein the loss of color (X) is determined by spectrocolorimetry in the following manner:

$$X = 100 * \left| \frac{\text{final Delta } E - \text{initial Delta } E}{\text{initial Delta } E} \right|. \qquad \text{[Math. 14]}$$

17. The process as claimed in claim 15, wherein the colored lubricant mold-release composition (I) comprises from about 0.01% and to about 3% by weight of non-fluorescent pigment (C) relative to the total weight of composition (I).

18. The process as claimed in claim 15, wherein the colored lubricant mold-release composition (I) further comprises (i) at least one crosslinking agent (G) comprising, per molecule, at least three=SiH units, and/or (ii) a catalyst (H).

19. The process as claimed in claim 15, wherein the colored lubricant mold-release composition (I) further comprises an air scavenger (J).

20. The process as claimed in claim 15, wherein in Step (2.), the vulcanization of the tire in the metal press is conducting at a temperature of from about 80° C. to about 220° C. and for a time of from about 10 minutes to about 24 hours.

21. The process as claimed in claim 15, wherein the non-fluorescent pigment (C) is in the form of an aqueous dispersion.

22. The process as claimed in claim 17, wherein the colored lubricant mold-release composition (I) comprises from about 0.1% to about 2.5% by weight of non-fluorescent pigment (C).

23. The process as claimed in claim 19, wherein the air scavenger (J) comprises glass beads.

* * * * *